United States Patent
Djuknic et al.

(10) Patent No.: US 7,860,151 B2
(45) Date of Patent: Dec. 28, 2010

(54) SYSTEM AND METHOD FOR GENERATING MULTICARRIER SPREAD SPECTRUM SIGNALS WITH CONSTANT ENVELOPE

(75) Inventors: Goran Djuknic, Tenafly, NJ (US); Chi Chiu Chan, Wayne, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 891 days.

(21) Appl. No.: 11/786,259

(22) Filed: Apr. 10, 2007

(65) Prior Publication Data
US 2008/0253433 A1  Oct. 16, 2008

(51) Int. Cl.
*H04B 1/00* (2006.01)
(52) U.S. Cl. .................. 375/146; 375/135; 375/260; 375/295
(58) Field of Classification Search ............... 375/135, 375/260, 295, 146
See application file for complete search history.

(56) References Cited

U.S. PATENT DOCUMENTS

| | | | | |
|---|---|---|---|---|
| 6,335,951 | B1 * | 1/2002 | Cangiani et al. | 375/298 |
| 7,505,506 | B1 * | 3/2009 | Djuknic et al. | 375/130 |
| 2002/0075907 | A1 * | 6/2002 | Cangiani et al. | 370/535 |
| 2002/0150068 | A1 * | 10/2002 | Orr et al. | 370/335 |

OTHER PUBLICATIONS

J. J. Spilker Jr. et al., "Code Multiplexing via Majority Logic for GPS Modernization", ION GPS-98; Proceedings of the 11th International Technical Meeting of the Satellite Division of the Institute of Navigation, Nashville, TN Pt. 1; United States Sep. 15-18, 1998, pp. 265-273, 1998.

S. Butman et al., "Interplex-An Efficient Multichannel PSK/PM Telemetry System", IEEE, Jun. 1972 pp. 415-419.

* cited by examiner

*Primary Examiner*—Ted M Wang
(74) *Attorney, Agent, or Firm*—RatnerPrestia

(57) ABSTRACT

A method of generating a multicarrier spread spectrum signal having a constant envelope includes partitioning multiple spreading codes into at least a first portion of spreading codes and a second portion of spreading codes. First and second modulating signals, respectively, are formed from the first and second portions of spreading codes. A first carrier spread spectrum signal is modulated with the first modulating signal to form a first modulated carrier signal, and a second carrier spread spectrum signal is modulated with the second modulating signal to form a second modulated carrier signal. The first and second modulated carrier signals are summed to form the multicarrier spread spectrum signal. The method includes combining spreading codes from the multiple spreading codes using majority voting logic to form the first and second portions of spreading codes.

17 Claims, 4 Drawing Sheets

| TIME | $t_1$ | $t_2$ | $t_3$ | $t_4$ | $t_5$ | $t_6$ | $t_7$ | $t_8$ |
|---|---|---|---|---|---|---|---|---|
| CODE 1 | +1 | +1 | +1 | +1 | −1 | −1 | −1 | −1 |
| CODE 2 | +1 | +1 | −1 | −1 | +1 | +1 | −1 | −1 |
| CODE 3 | +1 | −1 | +1 | −1 | +1 | −1 | +1 | −1 |
| MAJORITY | +1 | +1 | +1 | −1 | +1 | −1 | −1 | −1 |

SYSTEM AND METHOD FOR GENERATING MULTICARRIER SPREAD SPECTRUM SIGNALS WITH CONSTANT ENVELOPE

TECHNICAL FIELD

The present invention relates, in general, to Interplex modulation. More specifically, the present invention relates to a system and method of generating multicarrier spread spectrum signals having constant envelope.

BACKGROUND OF THE INVENTION

Interplex modulation is a technique for combining three or more signals to generate a constant envelope composite signal. A constant envelope composite signal is desirable, because it allows a highly efficient power amplifier to be utilized.

As an example, for three signals, $S_1$, $S_2$, and $S_3$, Interplex modulation allows combining these signals into a phase modulated composite signal that produces a constant envelope, thereby allowing the use of a high power amplifier without signal distortion. Taking these three signals, $S_1$, $S_2$, and $S_3$, an Interplex modulator generates a composite signal that includes three desired components plus an unwanted cross-product Signals generated by Interplex modulation are single-carrier, double sideband signals, which have a serious shortcoming and restriction. It is often desired to generate, amplify, and transmit spread-spectrum signals having multiple carriers, with each carrier modulated by one or more spreading codes.

A general form of an N-channel Interplex signal is as follows:

$$z(t) = \sqrt{2P_s} \sin\left[\omega_o t + \theta_1 s_1(t) + \sum_{n=2}^{N} \theta_n s_1(t) s_n(t)\right] \quad (1)$$

where $P_s$ is the signal power; $s_n(t)=d_n(t)sq(\omega_n t)=\pm 1$ are modulating signals, with $d_n(t)$ being the data and $sq(\omega_n t)$ being a periodic square waveform. Modulation indices $\theta_n$ determine the power allocated to each signal (or code), the power allocated to the RF carrier, and the power allocated (as a disadvantage) to cross modulation.

When N=3, for example, equation (1) may be rewritten as follows:

$$z(t)=\sqrt{2P_s}\sin[\omega_c t+\theta_1 s_1(t)+\theta_2 s_1(t)s_2(t)+\theta_3 s_1(t)s_3(t)] \quad (2)$$

The modulation indices $\theta_2$ and $\theta_3$ may be set to values that optimize data power efficiency, such as $$\theta_2 = \theta_3 = \frac{\pi}{4}.$$

Index $\theta_1$ may then be set to $$-\frac{\pi}{2}$$

in order to suppress the carrier. Equation (2) then becomes:

$$z(t)=\sqrt{P_s}[s_2(t)+s_3(t)]\sin \omega_c t+ \\ \sqrt{P_s}[s_1(t)-s_1(t)s_2(t)s_3(t)]\cos \omega_c t \quad (3)$$

The arrangement of the modulating (or code) signals in equation (3) is such that $$[s_2(t)+s_3(t)]^2+[s_1(t)-s_1(t)s_2(t)s_3(t)]^2=const \quad (4)$$

and $$[s_2(t)+s_3(t)][s_1(t)-s_1(t)s_2(t)s_3(t)]=0 \quad (5)$$

Consequently, the signal z(t) has a constant envelope. Inspection of equations (4) and (5) reveals that a constant envelope may be achieved by cancelling the appropriate terms, which is made possible by the introduction of the cross modulation term $s_1(t)s_2(t)s_3(t)$ in equation (3).

It will be understood, from Equation (1) that the Interplex method is applicable to single-carrier signals only. In U.S. patent application Ser. No. 11/067,148, filed on Feb. 25, 2005, by Goran Djuknic, et al., the Interplex method is extended to multiple carrier signals, each of which may be modulated (or spread) by multiple code signals. As described therein, the composite signal includes N carriers with the following form:

$$z(t) = \sqrt{2P_s} \sum_{i=1}^{N} CC_i(t)\cos 2\pi(f_o + f_i)t \quad (6)$$

Amplitudes $CC_i(t)$ are combinations of codes that modulate (or spread) the carriers at frequencies $f_o+f_i$. Constancy of the envelope of the signal z(t) from equation (6) is assured, if the amplitudes satisfy the following conditions:

Condition 1: (7)

$$\sum_{i=1}^{N} CC_i^2(t) = const$$

Condition 2:

$$CC_i(t)CC_j(t) = \begin{cases} const, & i = j \\ 0, & i \neq j \end{cases}$$

These conditions are met within any chip interval, $kT_c \leq t < (k+1)T_c$, for k=0, 1, 2 .... The $T_c$ is the common chip duration of codes constituting $CC_i(t)$'s. If codes in $CC_i(t)$ use different chipping rates, then $T_c$ is the duration of the shortest chip interval.

The conditions of equation (7) do not restrict placement of any number of code signals, in any combination, on any of the carrier frequencies. These conditions, based on a desired combination of spreading codes, just determine the type and number of additional cross-product terms necessary for canceling appropriate terms in order to provide a constant-envelope modulated signal.

The price paid for obtaining constant signal envelope is the generation of cross modulation terms, e.g. the terms $s_1(t)s_2(t)s_3(t)$ in Equation 3. These signals cannot be used by ordinary receivers in a constructive manner, and the power efficiency of the method is, therefore, reduced. The constancy of the modulated signal envelope may be achieved for any number of modulating signals, but that power efficiency quickly deteriorates with the number of signals combined. The same is true for both the original, single-carrier Interplex and the multicarrier method shown in equation (6).

A variation of the method described above may be obtained when both in-phase and quadrature components of multiple carriers are used to accommodate PRN codes. In general, for N carriers, the resulting composite signal has the following form:

$$s(t) = \sqrt{2P_s} \sum_{i=1}^{N} [CCI_i(t)\cos(\omega_o + \omega_i)t + CCQ_i(t)\sin(\omega_o + \omega_i)t] \quad (7a)$$

where CCI(t) and CCQ(t) are PRN (pseudo random noise) code combinations for spreading the in-phase and quadrature carrier components, respectively. The CCI(t) and CCQ(t), in addition to containing pure codes, in general, also contain terms that are products of pure codes (these are usually called cross-products.)

The multi-carrier composite signal of equation (7a) has a constant envelope if the following two conditions are met:

$$\sum_{i=1}^{N} [CCI_i^2(t) + CCQ_i^2(t)] = const \quad (7b)$$

and $$CCI_i(t)CCI_j(t) + CCQ_i(t)CCQ_j(t) = 0 \quad (7c)$$
$$CCI_j(t)CCQ_i(t) - CCI_i(t)CCQ_j(t) = 0$$
$$(i = 1, \ldots, N; \quad j = 1, \ldots, N; \quad i \neq j)$$

The conditions are satisfied within any chip interval, $kT_c \leq t < (k+1)T_c$, for $k=0, 1, 2, \ldots,$. The $T_c$ is the common chip duration of codes that constitute code combinations is $CCI_i(t)$ and $CCQ_i(t)$.

A major shortcoming of the Interplex method is that it achieves a constant envelope property on single-carrier signals only. In addition, the Interplex method becomes inefficient when used for combining more than three codes, since the number of code cross-products used for cancellations grows quickly when a larger number of codes are combined. Power efficiency decreases as the number of codes to be combined increases, since a larger number of cross-product terms has to be use for cancellations.

Another way to multiplex modulating codes is a majority logic method disclosed by Spilker and Orr, in an article titled "Code Multiplexing via Majority Logic for GPS Modernization," prepared for *Proc. ION GPS*-98, Sep. 15-18, 1998. The majority logic method operates on a principle that at a given time point, the set of chip values (that have values +1 or −1) of an odd number of component codes is inspected and a value of +1 or −1 is selected for the transmission, whichever is assumed by the majority of the codes, as shown in FIG. 1. If the codes share a common chip rate, the operation is done once per chip. When chip rates differ, majority combining is done at their least common multiple.

The majority logic combination of binary signals (or codes) has a good cross-correlation with the component codes, and it also yields a constant envelope signal. However, since the multiplexing is nonlinear, some signal power is lost to intermodulation products and the power efficiency of the method is reduced.

Majority logic combining may be done with uniform or non-uniform weighting. Uniform weighting is accomplished by a voting procedure as described above. In non-uniform weighting, values of some of the codes are given more weight in the voting process and, consequently, these codes end up having higher power in the composite signal.

The majority voting method has, generally, good power efficiency, but it applies only to single carrier signals and the number of codes to be combined has to be odd.

The present invention addresses these shortcomings.

SUMMARY OF THE INVENTION

To meet this and other needs, and in view of its purposes, the present invention provides a method of generating a multicarrier spread spectrum signal having a constant envelope. The method includes (a) partitioning multiple spreading codes into at least a first portion of spreading codes and a second portion of spreading codes; (b) forming first and second modulating signals, respectively, from the first and second portions of spreading codes; (c) modulating a first carrier spread spectrum signal with the first modulating signal to form a first modulated carrier signal; (d) modulating a second carrier spread spectrum signal with the second modulating signal to form a second modulated carrier signal; and (e) summing the first and second modulated carrier signals to form the multicarrier spread spectrum signal. Step (a) includes combining spreading codes from the multiple spreading codes using majority voting logic to form the first and second portions of spreading codes. Combining the spreading codes includes combining an odd number of spreading codes from the multiple spreading codes using majority voting logic.

The spreading codes have chip values of +1 and −1. Combining the spreading codes includes selecting an amplitude of +1 or −1, at a specific point in time, as a majority vote, based on inspecting a set of +1 or −1 chip values among the spreading codes at the specific point in time.

Step (c) includes modulating either an in-phase carrier or a quadrature carrier of the first carrier spread spectrum signal with the first modulating signal, and step (d) includes modulating either an in-phase carrier or a quadrature carrier of the second carrier spread spectrum signal with the second modulating signal.

A method of the invention includes a multicarrier spread spectrum signal having the following form:

$$s(t) = \sqrt{P_s}[s_1(t) + s_2(t)s_3(t)]\sin 2\pi f_1 t + \sqrt{P_s}[s_2(t) + s_1(t)s_3(t)]\cos 2\pi f_1 t$$

and the modulating signals are $s_1(t) = MV(C1, C2, C3)$ $s_2(t) = C7$ $s_3(t) = MV(C4, C5, C6)$ and MV=majority voting logic,
$f_1$=a first carrier frequency,
$f_2$=a second carrier frequency,
C1-C7=multiple spreading codes,
$P_s$=signal power Another embodiment of the invention is a method of generating a multicarrier spread spectrum signal having a constant envelope. This method includes the steps of: (a) combining an odd number of spreading codes using majority voting logic into a first modulating signal; (b) modulating a first carrier signal with the first modulating signal; (c) receiving a second modulating signal; (d) modulating a second carrier signal with the second modulating signal; and (e) summing the first and second modulated carrier signals to form the multicarrier spread spectrum signal having a constant envelope. Step (c) includes combining another odd number of spreading codes using majority voting logic to form the second modulating signal. This embodiment also includes a set of multiple spreading codes, where an odd number of spreading codes from the set of multiple spreading codes is used in the combining of step (a) to form the first modulating signal, and another odd number of spreading codes from the set of multiple spreading codes is used in the combining of step (c) to form the second modulating signal. In addition, this embodiment includes the steps of: combining any remaining odd number of spreading codes from the set of multiple spreading codes using majority voting logic to form a third modulating signal, and modulating either the first or second carrier signal with the third modulating signal. The first modulating signal modulates either an in-phase component or a quadrature component of the first carrier signal, and the second modulating signal modulates either an in-phase component or a quadrature component of the second carrier signal.

Yet another embodiment of the present invention is a system for generating a multicarrier spread spectrum signal having a constant envelope. The system includes a first majority voting module for combining an odd number of spreading codes using majority voting logic to form a first modulating signal, a second majority voting module for combining another odd number of spreading codes using majority voting logic to form a second modulating signal, and a third majority voting module for combining still another odd number of spreading codes using majority voting logic to form a third modulating signal. At least one modulator is included for spreading at least a first carrier using the first, second and third modulating signals. A summer is included for combining the first spread carrier with a second spread carrier to form the multicarrier spread spectrum signal. A second modulator is included for spreading another carrier to form the second spread carrier using the first, second and third modulating signals. A summing module is also included for combining the first and second spread carriers to form the multicarrier spread spectrum signal.

The first modulating signal is formed from the odd number of spreading codes from the set of multiple spreading codes. The second modulating signal is formed from the other odd number of spreading codes from the set of multiple spreading codes. The third modulating signal is formed from the still other odd number of spreading codes from the set of multiple spreading codes, being any remaining number of spreading codes from the set of multiple spreading codes. The one modulator spreads an in-phase component or a quadrature component of the first spread carrier. A second modulator spreads an in-phase component or a quadrature component of a second carrier using the first, second and third modulating signals to form the second spread carrier. The spreading codes have chip values of +1 and −1, and the system combines an odd number of spreading codes includes selecting an amplitude of +1 or −1, at a predetermined time interval, as a majority vote, based on inspecting a set of +1 or −1 chip values among the odd number of spreading codes at the predetermined time interval.

It is understood that the foregoing general description and the following detailed description are exemplary, but not restrictive, of the invention.

BRIEF DESCRIPTION OF THE FIGURES

The invention is best understood from the following detailed description when read in connection with the accompanying drawing. Included in the drawing are the following figures.

DETAILED DESCRIPTION OF THE INVENTION

The present invention, as will be explained, advantageously provides multicarrier operation and high power efficiency. At the same time, the present invention eliminates the disadvantage associated with the cross-product terms formed with the use of Interplex modulation and the disadvantage associated with the use of majority logic combining. In fact, the present invention minimizes the use of code cross-products and maximizes the use of majority logic combining, in order to achieve high power efficiency and reduce loss. In addition, majority logic combining may be accomplished with equal weighting of the multiple codes or unequal weighting of the multiple codes. Furthermore, unequal weighting of the codes allows for an easy way to fine tune power ratios among the combined codes.

An operation of the invention is exemplified below using a two-carrier spread spectrum signal. In this example, three spreading codes modulate one of the carriers, and four spreading codes modulate the other carrier. It will be appreciated, however, that the method may be applied to the generation of any number of carriers, with an arbitrary combination of codes modulating each of the carriers.

For example, consider the possibility of simultaneously generating GPS signals on L5 and L2 carriers. Assume that carrier L5 is modulated by three spreading codes, denoted as L51, L52 and C1; and carrier L2 is modulated by four codes, denoted as C, C2, M and P. Codes denoted as C, C1 and C2 are C/A-like codes. Codes denoted as P, L51, and L52 are P(Y)-like codes. Code M is a BOC(10,5) code (binary offset carrier code).

Figures 1, 2:
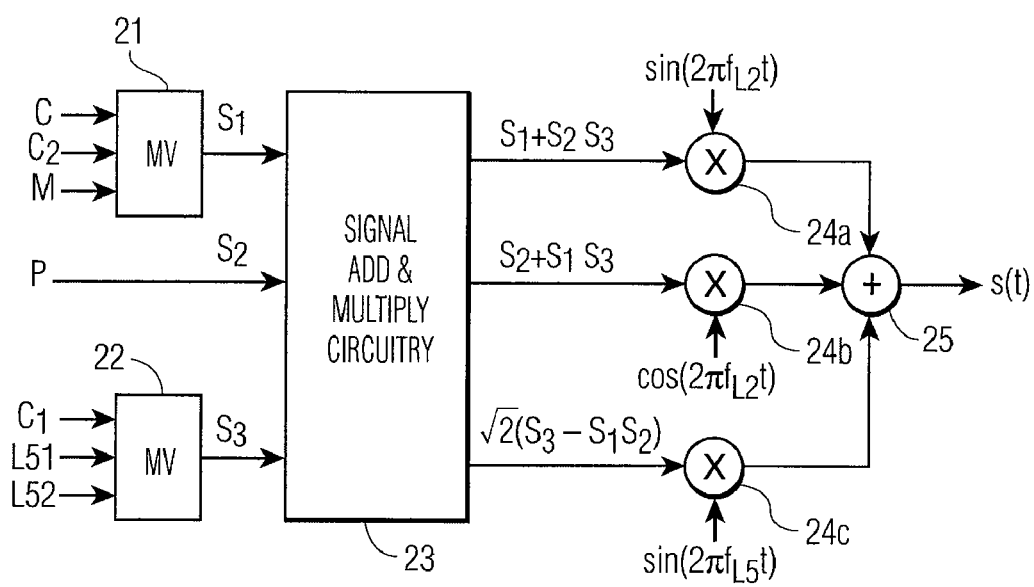
FIG. 1 provides an example of majority voting logic using three different spreading codes.
FIG. 2 is a functional block diagram of a system for generating a multicarrier spread spectrum signal having a constant envelope using seven different spreading codes, in accordance with an embodiment of the present invention.

Since there is an even number of codes on L2, three of the codes may be combined using majority voting (MV) logic to form the first modulating signal, $s_1(t)=MV(C, M, C2)$, which is placed on the quadrature L2 carrier. The fourth code forms a second modulating signal by itself, $s_2(t)=P$, and may be placed on the in-phase L2 carrier. In the L5 carrier case, three codes are combined using the majority voting logic, $s_3(t)=MV(L51, L52, C1)$, and placed on the quadrature carrier. The manner in which these codes are combined is shown in FIG. 2.

As shown, majority voting module 21 and majority voting module 22 combine an odd number of codes to form modulating signals $s_1$ and $s_3$. Code P is used as modulating signal $s_2$. Module 23 adds and multiplies the three modulating signals, $s_1$, $s_2$ and $s_3$, to form cross products $s_2s_3$, $s_1s_3$, and $s_1s_2$. These cross products are added, as shown, to individual modulating signals $s_1$, $s_2$ and $s_3$. First modulating signal $s_1$ and the cross product of $s_2s_3$ are used to modulate the quadrature component of the $f_{L2}$ carrier signal using mixer 24a. Similarly, the second modulating signal $s_2$ and the cross product of $s_1s_3$ are used to modulate the in-phase component of the $f_{L2}$ carrier signal using mixer 24b. Finally, the difference between the third modulating signal $s_3$ and the cross product of $s_1s_2$ are used to modulate the quadrature component of the $f_{L5}$ carrier signal using mixer 24c. The three modulated signals are summed by summer 25 to form the output signal s(t).

Figure 3:
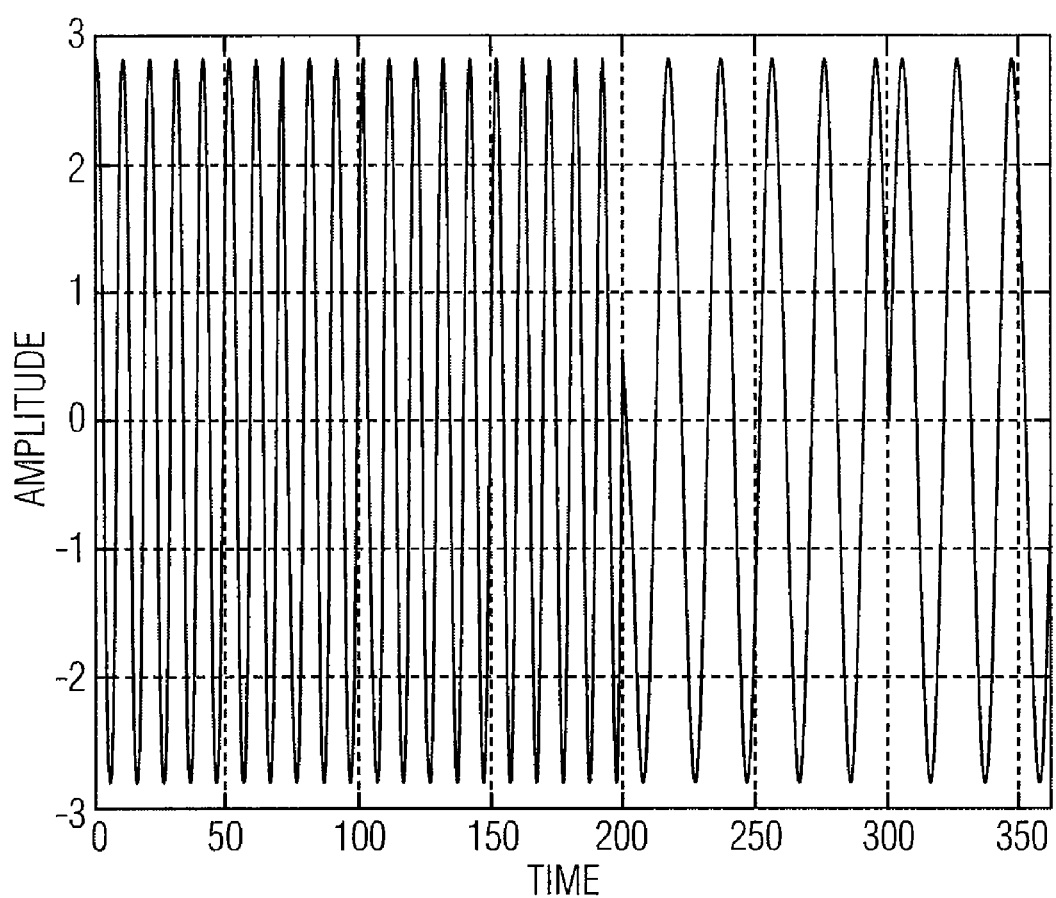
FIG. 3 is a plot of amplitude versus time for two carrier frequencies being modulated using the system of FIG. 2.

FIG. 3 depicts the result of the two carrier signal s(t), which is generated according to an embodiment of the present invention. Two different frequencies are clearly shown, with one of the carrier signals having both an in-phase component and a quadrature component. The resulting signal s(t) is a constant envelope signal.

Figure 4:
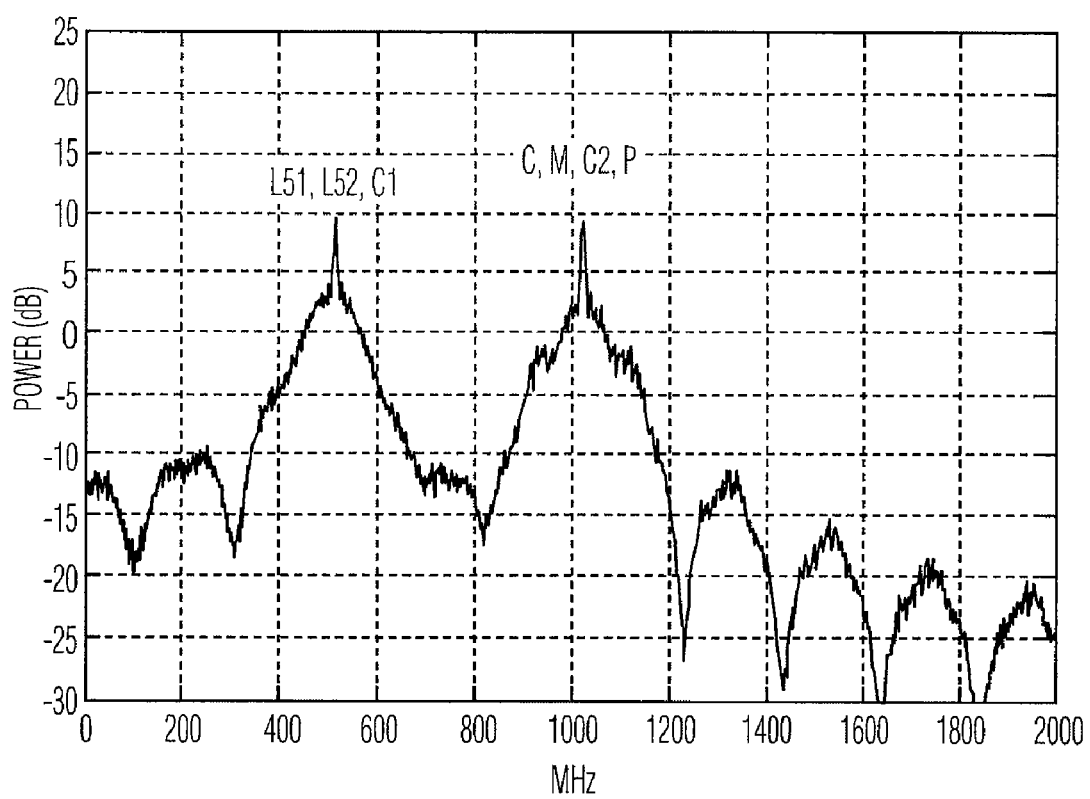
FIG. 4 is a spectral plot of power versus frequency showing two carrier frequencies being modulated by different spreading codes, in accordance with an embodiment of the present invention.

FIG. 4 depicts the two carrier signal spectrum modulated by the different codes. The first carrier is modulated by three different codes L51, L52 and C1; and the second carrier is modulated by four different codes, C, M, C2 and P.

The two carrier spread spectrum signal, shown as an output signal, has the following final form (based on equation 7a for N=2):

$$s(t) = \sqrt{P_s}\,\overline{[s_1(t) + s_2(t)s_3(t)]}\sin 2\pi f_{L2}t + \sqrt{P_s}\,\overline{[s_2(t) + s_1(t)s_3(t)]}\cos 2\pi f_{L2}t + \sqrt{P_s}\sqrt{2}\,\overline{[s_3(t) - s_1(t)s_2(t)]}\sin 2\pi f_{L5}t \quad (8)$$

The modulating signals are $s_1(t)=MV(C, M, C2)$ $s_2(t)=P$ $s_3(t)=MV(L51, L52, C1)$ \quad (9)

The function "MV" indicates that the codes are combined using majority voting logic, with equal weighting in this example. If unequal power ratios among the codes are required, unequal weighting of the codes in the majority logic combining may be used. It will be understood that unequal weighting does not affect the operation of the method.

Cross-products of the modulating signals, namely $s_1(t)s_2(t)$, $s_1(t)s_3(t)$ and $s_2(t)s_3(t)$, are needed for term cancellations in the process of creating the constant envelope signal in equation (8). But since they are not used in the demodulation process, they represent overhead and, therefore, reduce the power efficiency of the method. The number of cross-products (i.e., three) used in the above example is the minimum possible for the two carrier case. In general, if each modulating signal contained just one code and more than three codes were required, the number of cross-products would soon become prohibitive in terms of power efficiency.

It will be understood that the particular placement of codes on the in-phase and quadrature carriers, and the particular way that they are combined in the present example, is just one arrangement among the possible arrangements and that other arrangements may be devised. However, no other arrangement can improve on the power efficiency of the method. Furthermore, it is possible to use a minimal number of cross-products, since some of the codes are pre-multiplexed via majority voting.

In general, the majority voting logic is used by the present invention to combine an odd number of codes and the resulting signal may modulate either the in-phase or the quadrature component of a carrier. Furthermore, for an even number of codes, one of the codes may modulate either the in-phase or the quadrature component of a carrier, and the remaining odd number of codes may be combined via majority voting logic and used to modulate the other corresponding component (quadrature or in-phase) of the carrier.

The signal s(t) in equation (8) is shown in FIG. 3, and its spectrum is shown in FIG. 4. The signal s(t) is a constant envelope signal, since it fulfills the conditions of equations (7b) and (7c). Considering that signal amplitudes in equation (9) are ±1, it is easily shown that the following holds:

$$[s_1(t)+s_2(t)s_3(t)]^2+[s_2(t)+s_1(t)s_3(t)]^2+2[s_3(t)-s_1(t)s_2(t)]^2=8=const$$

$$\sqrt{2}[s_1(t)+s_2(t)s_3(t)][s_3(t)-s_1(t)s_2(t)]=0$$

$$\sqrt{2}[s_2(t)+s_1(t)s_3(t)][s_3(t)-s_1(t)s_2(t)]=0 \quad (10)$$

The aforementioned example may be generalized for a method of multiplexing an arbitrary number of codes on two carriers, while maintaining the maximum possible power efficiency for the two carriers. The generalized method may be implemented with the system shown in FIG. 5.

As shown, majority voting module 51 combines multiple codes using majority voting logic to form the first modulating signal $s_1$. Similarly, majority voting module 52 combines several different codes to form the second modulating signal $s_2$. Finally, majority voting module 53 combines yet another set of multiple codes using majority voting logic to form the third modulating signal $s_3$. Circuit 54 forms three different cross-products, namely $s_2s_3$, $s_1s_3$, and $s_1s_2$. These three cross-products are added, respectively, as shown to the first, second and third modulating signals.

The first modulating signal $s_1$ with the cross-products of $s_2s_3$ is used to modulate the quadrature component of the $f_1$ carrier signal using mixer 55a. The second modulating signal $s_2$ with the cross product of $s_1s_3$ is used to modulate the in-phase component of the $f_1$ carrier signal using mixer 55b. Finally, the difference between the third modulating signal $s_3$ and the cross-product of $s_1s_2$ are used to modulate the quadrature component of the $f_2$ carrier signal using mixer 55c. The now modulated in-phase and quadrature components of carrier $f_1$ and the modulated quadrature component of carrier $f_2$ are added together by summer 56 to form output signal s(t).

Figure 5:
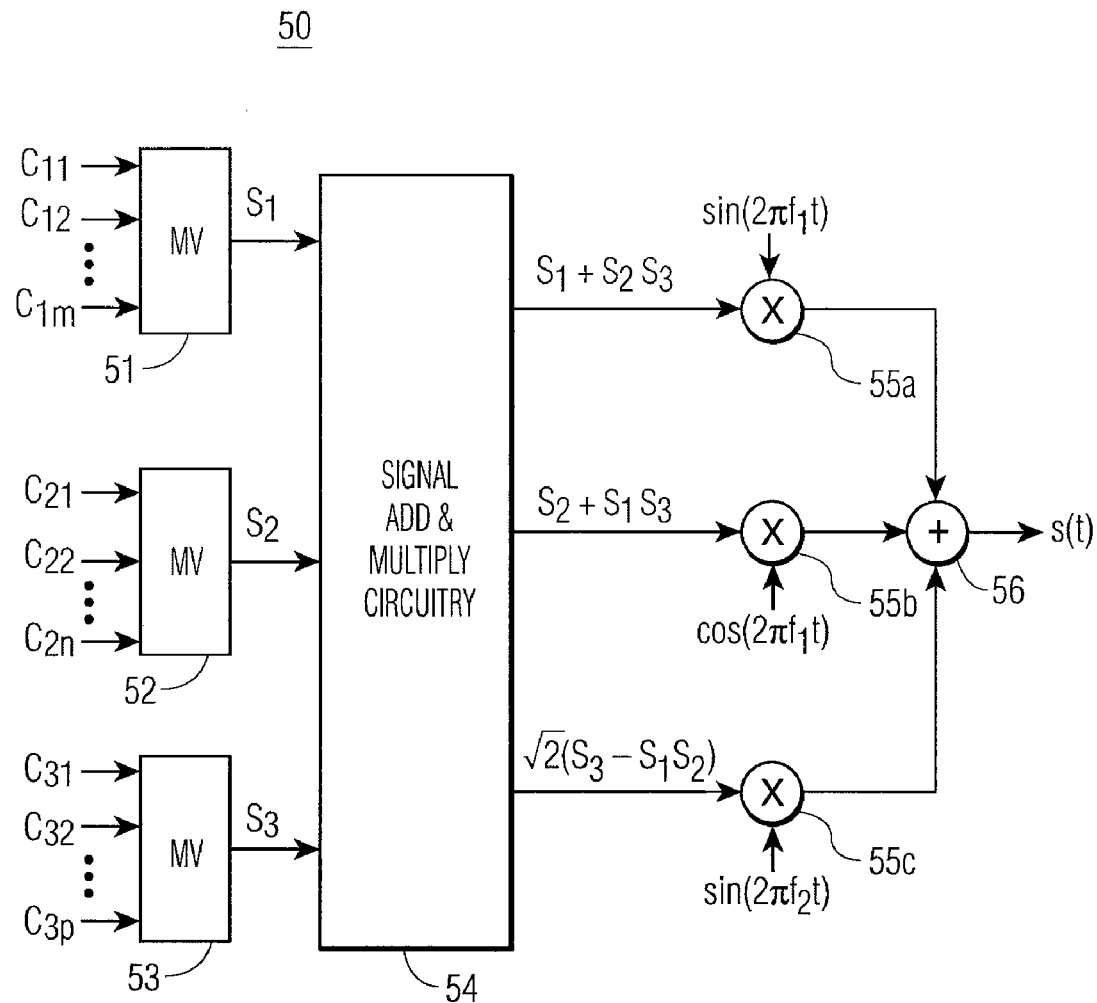
FIG. 5 is a block diagram of a system for generating a multicarrier spread spectrum signal having a constant envelope, in accordance with another embodiment of the present invention.

The $C_{ij}$ codes shown in FIG. 5 are arbitrary spreading codes, where m, n, and p must be odd to enable majority voting (MV). Frequencies, $f_1$ and $f_2$ may have arbitrary values and their ratio is not restricted to integers.

This present invention may be used to generate future GPS signals, where new communications and ranging codes are used to modulate a multiplicity of carriers. In the future, there will likely be other GPS codes than the GPS codes shown as examples in FIG. 2.

The present invention may also be used in any other application where multicarrier spread spectrum signals are generated and spectral efficiency is required.

The present invention may further be used in all circumstances where constant envelope, multicarrier spread spectrum signals are desired. The use of the invention is advantageous in combination with high-power amplifiers, but it is not restricted to such application. The present invention is applicable to both wireless and wired communications.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of generating a multicarrier spread spectrum signal having a constant envelope, comprising the steps of:
   (a) partitioning multiple spreading codes into at least a first portion of spreading codes and a second portion of spreading codes;
   (b) forming first and second modulating signals, respectively, from the first and second portions of spreading codes;
   (c) modulating a first carrier spread spectrum signal with the first modulating signal to form a first modulated carrier signal;
   (d) modulating a second carrier spread spectrum signal with the second modulating signal to form a second modulated carrier signal; and
   (e) summing the first and second modulated carrier signals to form the multicarrier spread spectrum signal;
   wherein step (a) includes
   partitioning the multiple spreading codes into an odd number of spreading codes to form the first portion of spreading codes,
   partitioning the multiple spreading codes into another odd number of spreading codes to form the second portion of spreading codes, and
   forming a third portion of spreading codes, if other spreading codes are present in the multiple spreading codes that are not included in the first and second portions of spreading codes.

2. The method of claim 1 wherein
   step (a) includes combining spreading codes from the multiple spreading codes using majority voting logic to form the first and second portions of spreading codes.

3. The method of claim 2 wherein
   combining the spreading codes includes combining an odd number of spreading codes from the multiple spreading codes using majority voting logic.

4. The method of claim 3 wherein
   combining the spreading codes includes combining three different spreading codes from the multiple spreading codes using majority voting logic.

5. The method of claim 2 wherein
   the spreading codes have chip values of +1 and −1, and
   combining the spreading codes includes selecting an amplitude of +1 or −1, at a specific point in time, as a majority vote, based on inspecting a set of +1 or −1 chip values among the spreading codes at the specific point in time.

6. The method of claim 1 wherein
   step (c) includes modulating either an in-phase carrier or a quadrature carrier of the first carrier spread spectrum signal with the first modulating signal, and
   step (d) includes modulating either an in-phase carrier or a quadrature carrier of the second carrier spread spectrum signal with the second modulating signal.

7. The method of claim 1 wherein
   step (b) includes forming a third modulating signal from the third portion of spreading codes, and modulating a third carrier spread spectrum signal to form a third modulated carrier signal; and
   step (e) includes summing the third modulated carrier signal with the first and second modulated carrier signals.

8. The method of claim 7 wherein
   the third carrier spread spectrum signal is either an in-phase or a quadrature carrier of the first carrier spread spectrum signal.

9. The method of claim 8 wherein
   the multicarrier spread spectrum signal has the following form:

$$s(t) = \sqrt{P_s} \, [s_1(t) + s_2(t)s_3(t)]\sin 2\pi f_1 t + \sqrt{P_s} \, [s_2(t) + s_1(t)s_3(t)]\cos 2\pi f_1 t + \sqrt{P_s} \, \sqrt{2} \, [s_3(t) - s_1(t)s_2(t)]\sin 2\pi f_2 t$$

and the modulating signals are
   $s_1(t) = MV(C1, C2, C3)$
   $s_2(t) = C7$
   $s_3(t) = MV(C4, C5, C6)$
   and $MV$ = majority voting logic,
   $f_1$ = a first carrier frequency,
   $f_2$ = a second carrier frequency,
   $C1$-$C7$ = multiple spreading codes,
   $P_s$ = signal power.

10. A method of generating a multicarrier spread spectrum signal having a constant envelope and a set of multiple spreading codes, comprising the steps of:
    (a) combining an odd number of spreading codes using majority voting logic into a first modulating signal;
    (b) modulating a first carrier signal with the first modulating signal;
    (c) receiving a second modulating signal;
    (d) modulating a second carrier signal with the second modulating signal; and
    (e) summing the first and second modulated carrier signals to form the multicarrier spread spectrum signal having a constant envelope;
    wherein an odd number of spreading codes from the set of multiple spreading codes is used in the combining of step (a) to form the first modulating signal, and
    another odd number of spreading codes from the set of multiple spreading codes is used in the combining of step (c) to form the second modulating signal, and
    the method further includes the steps of:
    combining any remaining odd number of spreading codes from the set of multiple spreading codes using majority voting logic to form a third modulating signal, and
    modulating either the first or second carrier signal with the third modulating signal.

11. The method of claim 10 wherein
    the first modulating signal modulates either an in-phase component or a quadrature component of the first carrier signal, and
    the second modulating signal modulates either an in-phase component or a quadrature component of the second carrier signal.

12. The method of claim 10 wherein
    the spreading codes have chip values of +1 and −1, and
    combining the odd number of spreading codes includes selecting an amplitude of +1 or −1, at a predetermined time interval, as a majority vote, based on inspecting a set of +1 or −1 chip values among the odd number of spreading codes at the predetermined time interval.

13. A system for generating a multicarrier spread spectrum signal having a constant envelope comprising
    a first majority voting module for combining an odd number of spreading codes using majority voting logic to form a first modulating signal, a second majority voting module for combining another odd number of spreading codes using majority voting logic to form a second modulating signal, a third majority voting module for combining still another odd number of spreading codes using majority voting logic to form a third modulating signal, at least one modulator for spreading at least a first carrier using the first, second and third modulating signals, and a summer for combining the first spread carrier with a second spread carrier to form the multicarrier spread spectrum signal.

14. The system of claim 13 including a second modulator for spreading another carrier to form the second spread carrier using the first, second and third modulating signals, and a summing module for combining the first and second spread carriers to form the multicarrier spread spectrum signal.

15. The system of claim 13 including a set of multiple spreading codes, wherein the first modulating signal is formed from the odd number of spreading codes from the set of multiple spreading codes, the second modulating signal is formed from the other odd number of spreading codes from the set of multiple spreading codes, and the third modulating signal is formed from the still other odd number of spreading codes from the set of multiple spreading codes, being any remaining number of spreading codes from the set of multiple spreading codes.

16. The system of claim 13 wherein the one modulator spreads an in-phase component or a quadrature component of the first spread carrier, and a second modulator spreads an in-phase component or a quadrature component of a second carrier using the first, second and third modulating signals to form the second spread carrier.

17. The system of claim 13 wherein the spreading codes have chip values of +1 and −1, and combining an odd number of spreading codes includes selecting an amplitude of +1 or −1, at a predetermined time interval, as a majority vote, based on inspecting a set of +1 or −1 chip values among the odd number of spreading codes at the predetermined time interval.

* * * * *